United States Patent [19]
Tobiasz

[11] Patent Number: 5,746,248
[45] Date of Patent: May 5, 1998

[54] SEALED HYDRAULIC COUPLING

[75] Inventor: André Tobiasz, Epinay sur Seine, France

[73] Assignee: Valeo, Paris, Cedex, France

[21] Appl. No.: 638,790

[22] Filed: Apr. 29, 1996

[30] Foreign Application Priority Data

Apr. 28, 1995 [FR] France .................. 95 05319

[51] Int. Cl.⁶ .................................................. F16L 37/28
[52] U.S. Cl. ........................................ 137/614.03; 137/614
[58] Field of Search .................. 137/614.03, 614.02, 137/614

[56] References Cited

U.S. PATENT DOCUMENTS

| | | | |
|---|---|---|---|
| 2,505,093 | 4/1950 | Brock | 137/614.03 |
| 2,854,259 | 9/1958 | Clark | 137/614.03 |

FOREIGN PATENT DOCUMENTS

| | | | |
|---|---|---|---|
| 0864604 | 5/1941 | France . | |
| 1080178 | 12/1954 | France . | |
| 2688291 | 9/1993 | France . | |
| 504404 | 4/1939 | United Kingdom | 137/614.03 |
| 557572 | 11/1943 | United Kingdom | 137/614.03 |
| 581636 | 10/1946 | United Kingdom | 137/614.03 |
| 2195729 | 4/1988 | United Kingdom . | |

*Primary Examiner*—A. Michael Chambers
*Attorney, Agent, or Firm*—Longacre & White

[57] ABSTRACT

A sealed hydraulic coupling comprises two coupling elements, each of which has an outer body, a rigid sleeve, and one part of a deformable duct which is fitted and gripped between the outer body and sleeve of the coupling element associated with it. The interior of each sleeve communicates with the interior of the associated duct part. An obturator is associated with each sleeve, which is closed by a closure member. Each sleeve is rigid and has a fluid flow port in its side wall, the end of each sleeve being closed by an end plug. The obturator of each coupling element comprises a sealing element interposed between the outer body and the corresponding end plug. One of these end plugs is fixed and carries a seating for a movable sealing ring, while the other one is movable and carries a further sealing ring. The invention is especially suitable for use with hydraulic clutch control systems for motor vehicles.

19 Claims, 3 Drawing Sheets

5,746,248

SEALED HYDRAULIC COUPLING

FIELD OF THE INVENTION

The present invention relates to sealed hydraulic couplings, especially for hydraulic servo systems, and in particular, though not exclusively, for the hydraulic control of a clutch or braking system.

BACKGROUND OF THE INVENTION

One coupling of this kind is described for example in French patent specification No. FR 1 080 178A, in which the coupling consists of two tubular elements which are so arranged that one of them can be introduced telescopically into the other, together with a device for locking the two elements together once they are so fitted together. Each element includes a closure member such that it is possible to fill each half of the hydraulic control system before the two halves are connected together by the hydraulic coupling.

Such a coupling is relatively expensive, which is why it was proposed, in French patent specification FR 2 688 291A, to make the two elements of the hydraulic coupling identical to each other. In that document, each coupling element comprises a cylindrical body which has a central hole for receiving the associated part of the deformable duct, which is fixed to the body of the coupling element by means of splined pins. The two bodies are arranged to abut against each other through their free ends when in the assembled position. In that position, the bodies are held together by locking means which have resilient lugs surrounded by a retaining collar.

Each cylindrical body serves as a receptacle for a sleeve mounted coaxially within the body, for flow of hydraulic fluid through the sleeve. Each of these sleeves has a free end which is closed by an end closure member or cap. Each sleeve is made of a resilient material, and thus constitutes an obturator which is operatively interposed, within the associated body, between the body and the corresponding end closure member, so as to render the coupling element concerned fluid-tight when the two coupling members are not assembled together.

When the coupling members are fitted together, the two end closure members come into contact with each other; and as the movement is continued, the sleeves become compressed. This causes the sleeves to bulge outwardly, and therefore to separate from the associated end closure members, thereby allowing fluid to flow between them. That type of embodiment has the disadvantage that it has poor resistance to fluid pressure until the two halves of the coupling have been connected together, because of the tendency of their sleeves to bulge.

Thus, separate preparation of the two halves of the hydraulic control system, with prior filling of pressurised hydraulic fluid, may not be viable and may even be impossible, because the deformation of the resilient sleeves, leading to separation from the associated end closure members, can thus give rise to loss of sealing and therefore leakage of fluid and loss of pressure.

In addition, there is a danger of air becoming trapped while the two coupling elements are being connected together, because their sleeves project axially from their bodies, there being a radial clearance between the outer periphery of the resilient sleeves and the bodies of the two coupling members.

DISCUSSION OF THE INVENTION

An object of the present invention is to overcome the above mentioned drawbacks in a simple and inexpensive way. Accordingly, the present invention aims to provide a novel coupling having two coupling elements, which gives reliable sealing prior to the two elements being fitted together, while at the same time preventing the introduction of air during the fitting of the two elements together, these objectives being obtained, again, in a simple and inexpensive way.

According to the invention, a sealed hydraulic coupling for interconnecting two parts of a duct of resilient material for conveying a fluid, especially for the hydraulic control of a clutch, in which the said coupling comprises two coupling elements, each of which comprises a hollow external cylindrical body receiving a free end portion of the associated said part of the deformable duct, a sleeve for conveying hydraulic fluid, the said sleeve being mounted coaxially within the outer body and having a free end which is closed by an end closure member, an obturator interposed within the outer body between the said body and the end closure member so as to render the corresponding element of the hydraulic coupling fluid-tight when the said coupling elements are not assembled together, and in which releasable locking means are interposed operatively between the two coupling elements so as to retain the latter in their assembled state, the end closure members being carried and retained by their associated sleeves and being adapted to make frontal contact with each other during assembly together of the two coupling elements, is characterised in that the said outer bodies are configured as a male part and a female part respectively, and are adapted to make intimate contact with each other, in that the sleeves are rigid and have, in the vicinity of their free ends, at least one fluid flow port, in that the free end portion of each said part of the deformable duct is gripped between the outer body and the sleeve of the associated said coupling element, so as to lie behind the said fluid flow port or ports in the associated sleeve, in that one of the said end closure members is a movable closure member, mounted for axial movement with respect to the free end of the associated sleeve so as to be guided by the latter, while the other end closure member is a fixed closure member fixed to the free end of its associated sleeve, in that one of the said obturators comprises a sealing ring which is movable axially and which is adapted to cooperate with a seating carried externally by the fixed end closure member, while the other obturator comprises a sealing ring carried externally by the movable end closure member and adapted to cooperate with a guide and sealing surface formed locally and internally on the appropriate outer body.

Thanks to the invention, the outer bodies of the two coupling elements have a simpler form than those in the prior art, while the sleeves, apart from their function of providing a passage through them for hydraulic fluid, have a further function, namely that of fastening the coupling element concerned to the associated part, made of deformable material, of the duct.

Thus, fastening pins such as those described in French patent specification FR 2 688 291A are eliminated, and, using coupling elements which are not identical to each other, a coupling is obtained which is less expensive and which is also less fragile before the coupling elements are connected together.

In addition, because of their rigidity, the sleeves are in no danger of bulging. Loss of sealing and of hydraulic fluid before the two halves of the coupling are connected together is therefore prevented.

The sleeves have an additional function, and in this connection the sleeve that has the fixed end closure member acts as a pusher member which pushes the movable end closure member into its associated sleeve, which acts as a guide tube to the movable end closure member for this purpose.

It will be appreciated that advantage is taken of the deformability of the duct so as to secure the latter in such a way that, in a simple and inexpensive way, the duct becomes an integral part of the coupling itself.

In addition, while the two coupling elements are being connected together, the two end closure members mate frontally together, and, for example, the male element establishes sealing with the movable sealing ring by pushing on the latter.

It will be noted that the obturators are protected, because in the unassembled state they are covered by the outer bodies of the two coupling elements. It will also be noted that these bodies facilitate assembly.

A slight clearance preferably exists between the outer body of the other element and the movable sealing ring when the end closure members come into contact with each other. This clearance enables air to be evacuated, the movable sealing ring being later displaced. There is thus no danger of air becoming trapped, especially since the outer bodies of the two coupling elements are in intimate contact with each other.

According to one preferred feature of the invention, centring means are interposed between the two end closure members, to ensure that the cooperation between these latter is reliable and that any jamming of the movable end closure member is avoided.

According to another preferred feature of the invention, the movable sealing ring and the movable end closure member are each subjected to the action of axially acting resilient means, such as a helical spring, which bears on a sealing ring in contact with the duct part concerned, so that in this way, closure valves are obtained in a very inexpensive way. Thus, by exerting force on each element of the coupling, the resilient means are compressed while preserving sealing against air. The stiffness of these springs does of course depend on the particular application, and these should be such as to ensure sealing when the two coupling elements are not assembled together, while being not too stiff to facilitate the fitting of the coupling elements together.

The outer bodies of the two coupling elements are preferably in the form of ferrules, which reduces the cost of manufacture. These ferrules are preferably provided, in the region of their rear portion, with inwardly directed projecting elements which are anchored in the free end of the associated part of the deformable duct, so as to secure the latter.

Each sleeve may of course also have outwardly directed projections which are anchored in the associated duct portion, again for fixing the latter in position. Both duct portions are thus fastened solid in the connector, with the gripping effect being increased.

The outer body of the female coupling element may have resiliently deformable lugs, which constitute part of the locking means that act between the two elements of the coupling so as to hold the latter together in their assembled state. Advantage is thus taken of the female element, this being the longer one, while the number of components is reduced, the need for a fastening collar being no longer necessary.

The ferrules are preferably made of metal, so that their thickness can be reduced, so assisting a reduction in the overall radial size of the coupling, together with good resistance to hydraulic pressure.

The projecting elements for fastening the duct parts can easily be formed by a stamping or punching operation carried out from outside, in such a way as to form claws which prevent the duct part from being pulled out of the coupling.

The resiliently deformable lugs of the locking means can easily be made by press forming, and can readily be adapted to cooperate with the rear end of the outer body of the male coupling element.

In one embodiment, it is the male coupling element that carries the movable end closure member. This arrangement enables the free end of the outer body of the male element to exert a pushing force on the movable sealing ring carried by the female coupling element.

It is of course possible to reverse the structures.

Various features and advantages of the invention will be understood more clearly on a reading of the following description of preferred embodiments of the invention, which is given by way of non-limiting example only and with reference to the accompanying drawings.

DESCRIPTION OF PREFERRED EMBODIMENTS OF THE INVENTION

Figure 1:
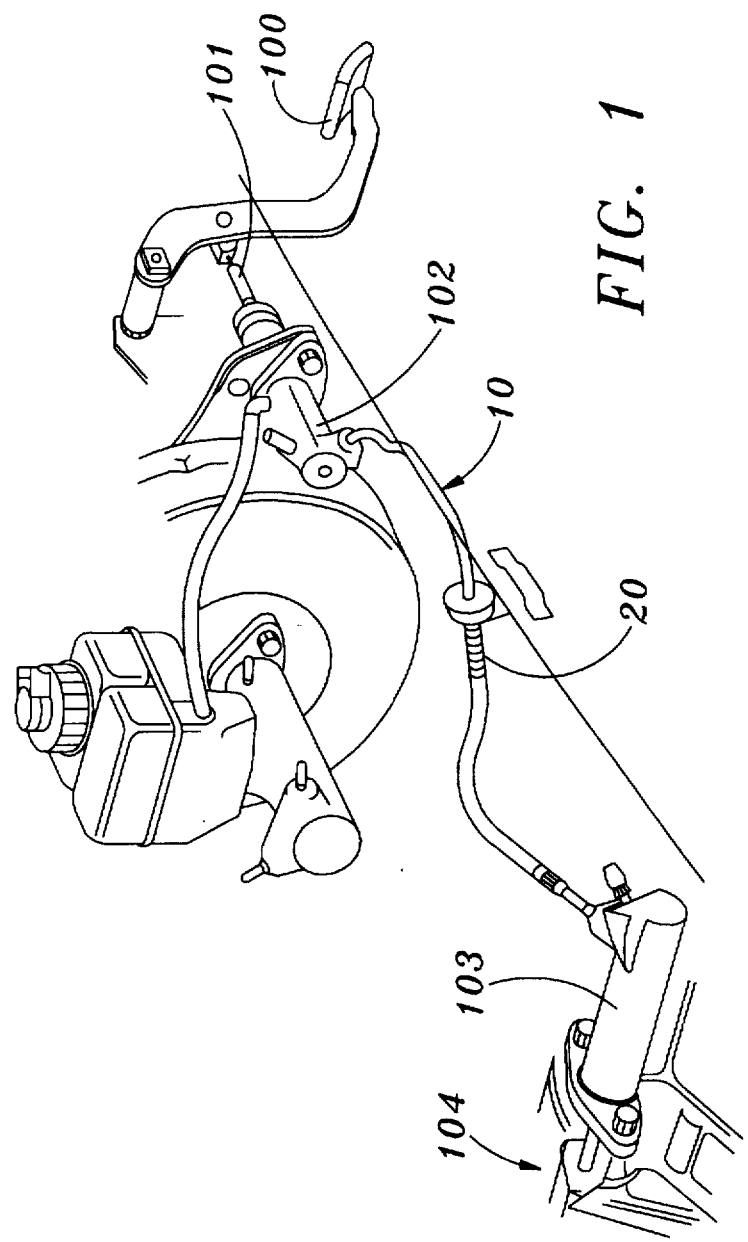
FIG. 1 is a diagrammatic view of a hydraulic clutch control system including a coupling in accordance with the invention.

The sealed hydraulic coupling 20 is adapted to interconnect, here in a very rapid way, two parts 10A and 10B of a duct 10 for carrying a fluid. In this example the duct 10 is of a suitable deformable material which may, for example be a flexible or semi-rigid material. It may for example be of a flexible or semi-rigid plastics material. In the context of an application of the system to a hydraulic clutch control system, the hydraulic coupling 20 is arranged to be mounted between the emitter 102 and the receiver 103 of the control system.

In a manner known per se, the hydraulic clutch control system includes a clutch pedal 100 which is arranged to actuate a master cylinder 102 through a push rod 101, which is coupled to the piston (not shown) of the master cylinder 102. The fluid duct 10 connects the master cylinder 102, which constitutes the emitter of the hydraulic control system, to the receiver 103 of the latter. The piston (not shown) of the receiver 103 is connected to a rod which is arranged to act on the declutching fork 104. It is often desirable to fill the receiver 103 and 102 beforehand. This is made possible by the coupling 20 now to be described.

The coupling 20 comprises two elements 21 and 22, each of which includes a hollow outer cylindrical body 1, 11 respectively, receiving the free end portion of the appropriate duct part 10A or 10B of the deformable duct 10.

Each of the coupling elements 21 and 22 includes an outer body 1, 11 respectively. A sleeve 4 is mounted coaxially within the outer body 1, and a similar sleeve 4 is mounted coaxially within the outer body 11. These sleeves 4, for flow of fluid through them, have a free end which is closed by an end plug, indicated at 5 for the coupling element 21, and at 12 for the coupling element 22. These end plugs are carried and retained by the free ends of their respective associated sleeves 4, and are adapted to make frontal, or endwise, contact with each other during the fitting together of the two coupling elements 21 and 22. The end plugs 5 and 12 are of an aluminium based material in this example.

Each of the coupling elements 21 and 22 includes an obturator indicated at 6 and at 12, 13 respectively, which is disposed within the corresponding outer body 1 or 11, between the latter and the end plug 5 or 12 so as to seal the respective coupling element 21 or 22 when the elements 21 and 22 are not assembled together. In addition, locking means 2, which in this example are releasable, are arranged operatively between the two coupling elements 21 or 22 so as to retain the latter in their assembled state.

The outer bodies 1 and 11 of the two coupling elements 21 and 22 are configured as a female and a male member respectively, and are arranged to make intimate contact with each other. The sleeves 4 are rigid and have at least one fluid flow port 25 formed in the cylindrical wall of the sleeve close to the free end of the sleeve. In this example the sleeves 4 are of metal. Because these sleeves are rigid, the free end of each of the parts 10A and 10B of the deformable duct 10 is gripped between the respective outer body 1 or 11 and the corresponding sleeve 4, and lies behind the fluid flow port or ports 25 in the corresponding sleeve 4. The end plug 12 is a movable plug, being mounted for axial movement with respect to the free end of the corresponding sleeve 4. The other end plug 5 is a fixed end plug, being fixed to the free end of its corresponding sleeve 4. Movement of the movable end plug 1 2 is guided by its sleeve 4.

One of the obturators consists of a sealing ring 6 which is movable axially, and which is adapted to cooperate, when the coupling elements 21 and 22 are not assembled together, with a seating 26 formed externally on the fixed end plug 5. The other obturator comprises a further sealing ring 13, which is carried on the outside of the movable end plug 12 and which is adapted to cooperate with a sealing guide surface 27 formed on a local inward projection of the outer body 11 of the coupling element 22.

In this example, each outer body 1 or 11 consists of a tubular cylindrical ferrule having a rear portion for gripping the end of the associated part 10A or 10B of the deformable fluid duct 10. This end portion of each outer body has inwardly extending projecting elements 3 which are anchored in the deformable free end of the associated part 10A or 10B of the duct 10, so as to secure that part in position.

Each sleeve 4 is formed with outwardly projecting elements (which have no reference numerals on the drawings), which are anchored in the deformable free end of the associated part 10A or 10B of the duct 10. In this way, the two duct parts 10A and 10B are secured solidly and firmly in the respective coupling elements 21 and 22, and these duct parts accordingly become, in a simple and inexpensive way, part of the coupling 20.

Figure 4:
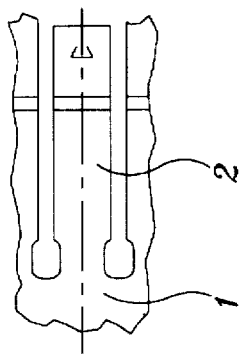
FIG. 4 is a partial view showing a resiliently deformable lug of the locking means.

The outer body or ferrule 1 of the female coupling element 21 has resiliently deformable lugs 2, which constitute the above mentioned locking means and which are formed, as can be seen in FIG. 4, between longitudinal slots which are open into widened apertures through the wall of the ferrule 1. In this example, these lugs 2 are arranged to engage with the rear end portion of the ferrule 11 of the male coupling element 22, and for this purpose the lugs are formed with at least one inclined terminal nib. Thus, as can be seen in FIG. 4, a single nib is provided at the free end of the lug 2.

The ferrules 1 and 11 may be made of glass fibre reinforced plastics material, but in this example they are preferably of metal, which enables the thickness of the ferrules to be reduced, and also enables the coupling 20 to be made highly resistant to fluid pressure. In addition, the metal ferrules 1 and 11 enable the projecting elements 3 and the lugs or tongues 2 to be formed in a simple way. Thus, the projecting elements 3 may be formed from outside, by stamping followed by inward bending, or, in another method, by inward deformation or by punching from outside, so as to form the projecting elements 3 as claws which are oriented towards the free ends of the respective duct part 10A or 10B, so as to prevent the latter from being withdrawn. These projecting elements 3 increase the gripping effect on the duct parts 10A and 10B, and may consist of indentations or be in another similar form. They generally constitute nibs or claws or sawtooth elements.

The resiliently deformable lugs 2 are readily made by stamping followed by bending, and may be of substantial length, due to the fact that the female coupling element 21 surrounds the male coupling element 22.

It will be noted that the free end portion of the ferrule 1 of the female coupling element 21 is flared, so as to facilitate introduction of the ferrule 11 of the male coupling element 22. In order to assemble the two coupling elements 21 and 22 together, the male element is introduced by insertion telescopically within the female coupling element 21. More precisely, the outer periphery of the ferrule 11 of the male coupling element 22 is arranged to make intimate contact with the inner periphery of the ferrule 1 of the female coupling element 21, being accordingly guided axially.

The rear portion of the female coupling element 21, carrying the projecting elements 3 which, as noted above, are in the form of claws in this example, is of reduced diameter as compared with the main portion of the ferrule 1, thus defining a change in diameter such that the ferrule 1 of the female coupling element 21 is able to envelop the ferrule 11 of the male coupling element 22.

It will be noted that the terminal nibs of the resiliently deformable lugs or tongues 2 are formed in the flared mouth at the free end of the female ferrule 1. These nibs are arranged to engage with the rear end portion of the male ferrule 11, for which purpose the rear end of the ferrule 11 is chamfered.

Figure 2:
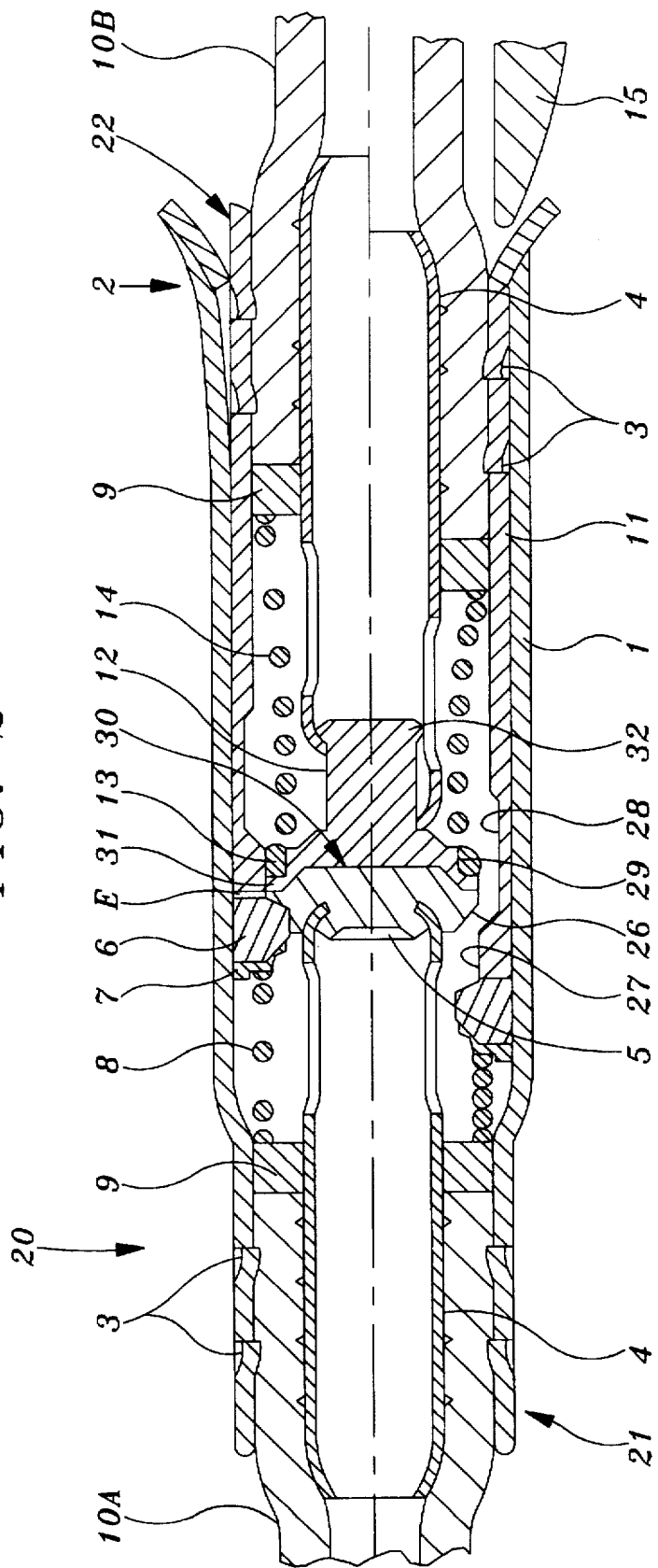
FIG. 2 is a view in axial cross section of a coupling in accordance with the invention, with the upper part of this view corresponding to the phase in which the two elements of the coupling are brought face to face with each other, the lower part of the Figure representing the position in which the two elements of the coupling are interconnected so as to permit flow of the pressurised liquid through the coupling.
Figure 3:
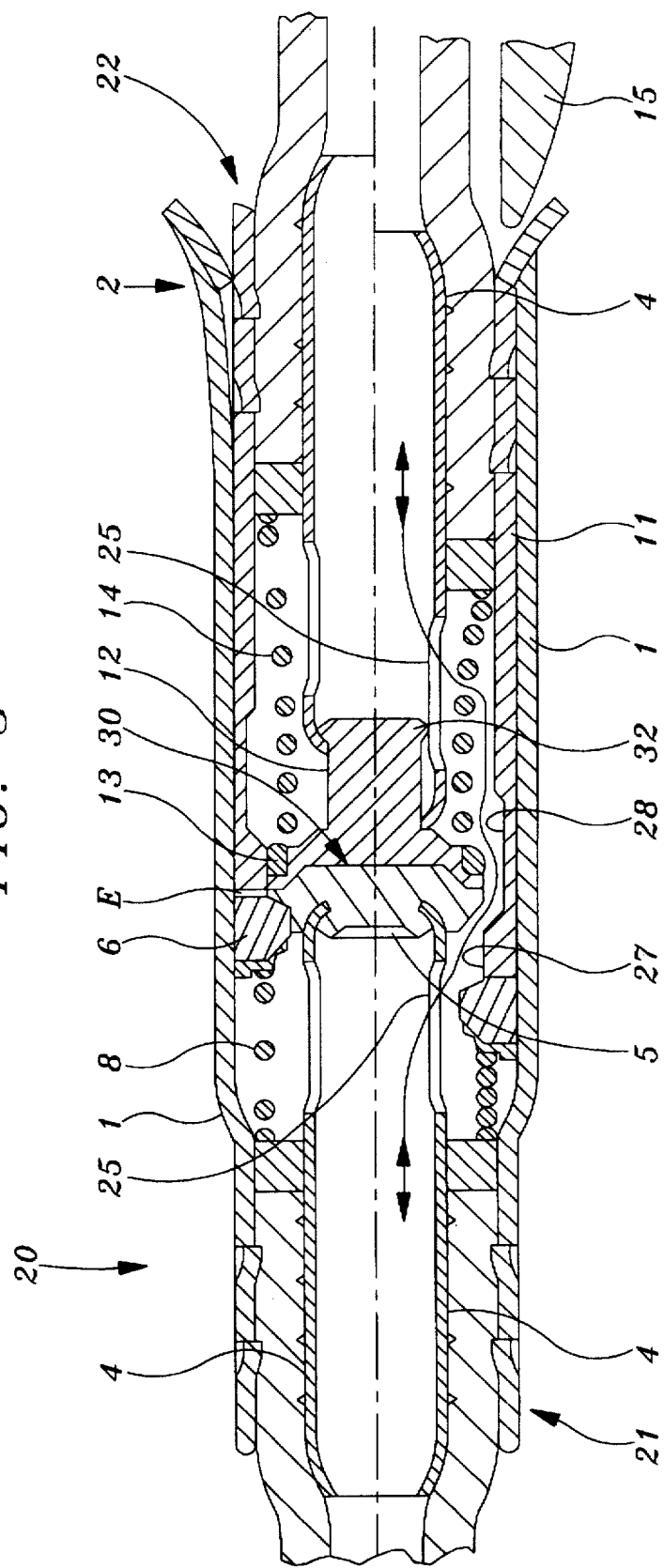
FIG. 3 is a view similar to FIG. 2, but for a modified embodiment.

In this example, it is the male coupling element 22 that carries the movable end plug 12, so that the latter constitutes a draw member. This draw member 12 has a tail portion of reduced diameter, the free end of which is formed with a collar portion 32 which is arranged to make contact with the internal bore of the associated sleeve 4. This sleeve 4 has a free end of restricted form. This free end is engaged in a groove formed in the tail portion of the draw member 12, as can be seen in FIGS. 2 and 3. The draw member 12 is thus mounted through its tail portion for axial movement in the bore of the sleeve 4, being guided by the collar portion 32, which has a tapered cross section as can be seen in FIG. 2.

In the unassembled state, the collar portion is in contact with the free end of the sleeve 4, which is configured so as to match the inclined flank of the collar portion 32. The free end of the sleeve 4 not only guides the draw member 12, but also retains the latter within the sleeve.

The frontal portion of the draw member 12 has an axially oriented annular surface 29 for centring the sealing ring 13, which in this example is an O-ring seal. Axially acting resilient means in the form of a spring 14 bear on the draw member 12, behind the frontal portion of the latter. The frontal portion is shouldered for this purpose. The other end of the spring 14 bears on a sealing ring 9 which is in axial engagement against the deformable part 10B of the duct 10. This static sealing ring 9 is interposed radially, under precompression, between the outer periphery of the associated sleeve 4 and the inner periphery of the ferrule 11 of the coupling element 22.

The fixed end plug 5 is secured by seaming to the free end of the sleeve 4 of the female coupling element 21. More precisely, the end plug 5 initially has a dorsal portion of reduced diameter which enables the end plug 5 to be inserted into the constricted end portion of the associated sleeve 4, making contact with the outer face of that free end portion. The dorsal face of the portion of reduced diameter has an aperture in the form of a blind hole, and a chamfered punch is introduced into the sleeve 4, after which the seaming operation is carried out. During the course of this seaming operation, the punch causes the edge of the blind hole to deform in plastic flow so as to reach the configuration shown in FIG. 2. Thus, the end plug 5 constitutes a stopper, having a frusto-conical annular portion 26 defining the seating, mentioned earlier herein, for the movable sealing ring 6 carried for axial movement by the female coupling element 21. The movable sealing ring 6 is accordingly formed with an inclined face that cooperates with the complementary seating 26, thus providing a sealing effect.

Axially acting resilient means, in the form of a spring 8, bias the sealing ring 6 into contact with the seating 26, and bear on a second static sealing ring 9, which is itself in engagement against the part 10A of the duct 10. The sealing ring 9 is interposed radially between the outer periphery of the sleeve 4 of the female coupling element 21 and the inner periphery of the outer body or ferrule 1, in the same way as the sealing ring 9 of the male coupling element 22. In this example, the resilient means 14 and 8 consist of helical springs surrounding the free ends of the respective sleeves 4. The spring 8 bears on the sealing ring 6 through a metallic insert 7, so as to prevent the spring 8 from becoming embedded in the sealing ring 6. It will be noted that the sealing ring 6 has a trapezoidal cross section.

In this example, each of the sleeves 4 has a plurality of the passages or ports 25, spaced apart at regular intervals circumferentially. The actual number of these ports on each sleeve depends on the particular application. The fluid flow port 25 consists of oblong holes which extend to the vicinity of the static sealing rings 9. It will also be noted that each of the sleeves 4 has at its rear end a constricted portion so as to avoid any damage to the duct parts 10A and 10B.

The axially oriented cylindrical surface 27, already mentioned earlier herein, is formed internally at the free end of the male ferrule 11. This surface 27 constitutes a guide and sealing surface for the sealing ring 13, and is followed, going from left to right as seen in FIG. 2, by a relief groove 28, the purpose of which is to enable fluid to flow through the assembled coupling, as is best seen in FIG. 3. Thus, before the two coupling elements 21 and 22 are assembled together, the sealing rings 6 and 13, by cooperation with the seating 26 and the surface 27 respectively, ensure that the coupling elements 21 and 22 are sealed from each other.

Both of these coupling elements may already be under pressure as mentioned earlier herein. It will be noted that this fluid pressure squeezes the sealing ring 6 into contact with its seating 26, and also squeezes the sealing ring 13 into contact with a radial shoulder 31, which is formed in a radial collar portion which defines the cylindrical centring surface 29. The sealing ring 13 is also forced under pressure against the surface 27.

Prior to assembly of the coupling, the collar portion 32 of the tail portion of the draw member 12 comes into contact with the constricted free end portion of the associated sleeve 4, so that the sealing ring 13 is then in contact with its sealing guide surface 27.

Thus the sleeve 4 of the male coupling member 22 maintains the collar portion 32 in position axially by virtue of its constricted free end portion.

Centring means are arranged to act between the fixed end plug 5 and the draw member 12. To this end, the draw member 12 has a frustoconical, central, frontal cavity having a flat base delimited by a frustoconical flange, while the fixed end plug 5 has an axial projecting portion which fits the profile of the frontal cavity in the draw member 12. This projecting element of the plug 5 is therefore in the form of a male element which penetrates into the complementary frontal cavity of the draw member 12, which is itself therefore a female element.

Because of the cooperation between the frusto-conical flanks, good axial guidance of the draw member 12 is obtained when the male coupling element 22 is fitted into the female coupling element 21 during assembly. During this fitting operation, the fixed end plug 5, with its associated sleeve 4, acts as a pusher, whereby the draw member 12 is forced into its associated sleeve 4.

Also during this operation, the free end portion of the ferrule 11 of the male coupling member 22 comes into contact with the sealing ring 6 and displaces the latter axially, so that the sealing ring 6 slides in the internal bore of the ferrule 1 of the female coupling element 21. Thus, while this connection is being made, the two end plugs 5, 6 and 12 mate together and cause the two springs 8 and 14 to be compressed, while preserving sealing between the two ferrules 1, 11 and the sealing rings 6 and 13.

The connecting operation is concluded by a movement of the tongues 2, which clip behind the terminal end of the ferrule 11 of the male coupling element 22. More precisely, there is an operating clearance E between the free end of the ferrule 11 and the movable sealing ring 6 when the end plugs 5 and 6 come into mutual contact, that is to say when they are mated. Thus, during the telescopic assembly of the two coupling elements 21 and 22, contact is made in a first step between the fixed end plug 5 and the draw member 12, with these two components being mutually centred. The clearance E makes it possible to evacuate air. In a second stage, the operating clearance E is taken up, with evacuation of the air, until sealing is obtained between the ferrule 11 (i.e. the free end of the latter), and the movable sealing ring 6.

In a third stage, a passage is opened between the movable sealing ring 6 and the fixed end plug 5, with the sealing ring 6 then leaving its seating 26. In a fourth stage, the sealing ring 13 is displaced so as to be aligned with the groove 28, thus enabling fluid to flow between the two coupling elements 21 and 22.

With reference to FIG. 3, it will be appreciated that this fluid flow is easily obtained without any substantial turbulence.

The movement between the two coupling elements 21 and 22 is concluded by the lugs 2 which lock these coupling elements together, with the nibs of the lugs 2 engaging with the rear terminal edge of the ferrule 11.

Thus, it will be seen that the length of the cylindrical surface 27 is a function of the operating clearance E and of the various stages, described above, in the assembly operation.

It will be noted that the upper, or radially outer, portion of the movable sealing ring 6 is of rectangular cross section for contact with the male ferrule 11, and that its radially inner part is of trapezoidal cross section.

It will be appreciated that the coupling 20 is adapted for rapid connection and also for rapid disconnection. To this end, it is sufficient to employ a key 15 (FIGS. 2 and 3), having a tapered end, for lifting the tongues 2 and thereby enabling the two coupling elements 21 and 22 to be disconnected from each other.

Figure 5:
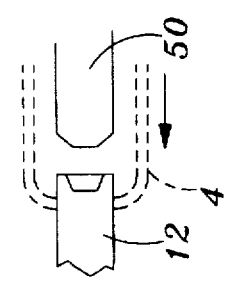
FIG. 5 is a diagrammatic view showing the formation of the collar portion of the draw member in FIG. 3.

In FIG. 2, the sleeves 4 are made in the form of two half shells which enable the fixed end plug 5 and the draw member 12 to be placed initially in the sleeves. However, in a modified version which is shown in FIG. 3, each of the sleeves 4 is made in one piece. In this case, the draw member 12 has a blind hole or recess formed in the back face of its tail portion. In this connection reference is made to FIG. 5, which shows how a punch 50 with a frusto-conical end is introduced into the sleeve 4 in order to upset the material of the tail portion of the draw member 12, so as to form the collar portion 32. FIG. 3 also shows the path which is followed by the fluid when the two coupling elements 21 and 22 are interconnected.

The outer diameter of the fixed plug member 5 is of course such that it does not interfere with the ferrule 11 of the female coupling element 21. In this example the outer diameter of the plug 5 is generally equal to the diameter of the sealing guide surface 27.

It will be noted that the profile of the sealing ring 6 is favourable to the flow of fluid, by virtue of its inclined face.

The present invention is of course not limited to the embodiments described above. In particular, the structures may be reversed, so that fixed end plug 5 is carried by the male coupling element 22, and the movable end plug 12 is carried by the female coupling element 21.

The coupling in accordance with the invention may of course find practical application in any hydraulic servo system. However, it is particularly useful in the context of a hydraulic clutch control system, because the pressures involved are compatible with securing the two duct parts 10A and 10B together in the manner described above. In such an application, the male coupling member is preferably associated with the emitter or master cylinder 102 (FIG. 1), which has been filled beforehand with hydraulic fluid, while the female coupling member is associated with the receiver 103, which has also been filled with hydraulic fluid beforehand. This arrangement is preferable because the male coupling element 22 is resistant to higher pressures.

What is claimed is:

1. A duct for conveying a fluid, comprising two duct parts of deformable material each having a free end portion, and a hydraulic coupling sealingly interconnecting the two said duct portions, said coupling comprising two coupling elements, each said coupling element comprising: a hollow cylindrical outer body for receiving the free end portion of a respective one of the said duct parts; a sleeve, for passage of fluid through it, the sleeve being mounted coaxially within the said outer body and having a free end portion; an end closure member closing the free end portion of the sleeve; and an obturator within the outer body of the coupling member, interposed between the said body and the end closure member so as to render the coupling element fluid-tight when the two coupling elements are disconnected from each other, the coupling further including releasable locking means carried by the said coupling elements for retaining the coupling elements together, said end closure members being carried and retained by the respective associated sleeves and being adapted to make frontal mutual contact when the two coupling elements are fitted together, wherein one said outer body is a male part and the other said outer body is a female part, said male and female parts being adapted to make intimate contact with each other, each said sleeve being rigid and defining fluid flow port means in the vicinity of its said free end, said free end of each said duct part being gripped between the said outer body and sleeve of the associated said coupling element and lying behind the said fluid flow port means of the said sleeve, one said end closure member being a movable end closure member mounted for axial movement with respect to the free end portion of its associated sleeve so as to be guided by the latter, the other end closure member being a fixed end closure member fixed to the free end of its associated said sleeve, the fixed end closure member defining an external seating, one of the said obturators comprising an axially movable first sealing ring adapted to cooperate with the said seating, the coupling element having the movable end closure member defining on its outer body an internal local guide and sealing surface, the other one of the said obturators comprising a second sealing ring carried on the outside of the movable closure member for cooperation with said guide and sealing surface.

2. A duct according to claim 1, wherein each said outer body comprises a cylindrical ferrule having a rear portion for gripping the end of the deformable end portion of the associated duct part.

3. A duct according to claim 2, wherein each said ferrule rear portion defines inwardly directed projecting elements anchored in the deformable free end portion of the associated duct part.

4. A duct according to claim 3, wherein the said projecting elements are claws formed by punching from outside.

5. A duct according to claim 3, wherein each said sleeve has outwardly directed projecting elements anchored in the associated said duct part.

6. A duct according to claim 2, wherein the said locking means comprise resiliently deformable lugs formed in the ferrule of the female coupling element.

7. A duct according to claim 6, wherein the ferrule of the male coupling element has a rear end, the said lugs having at least one inclined terminal nib for engagement with the said ferrule rear end.

8. A duct according to claim 6, wherein the free end of the ferrule of the female coupling element is flared.

9. A duct according to claim 2, wherein the ferrule carrying the first sealing ring has an internal bore, the first sealing ring being adapted for axial sliding movement along the said internal bore.

10. A duct according to claim 1, wherein each said coupling element further includes a fixed third sealing ring located axially by the associated duct part and radially by the corresponding sleeve and ferrule, and axially acting resilient means bearing at one end thereof on the said third sealing ring, the other end of the said resilient means bearing, in the coupling element having the movable end closure member, on the movable end closure member, and, in the other coupling member, on the first sealing ring.

11. A duct according to claim 10, wherein the fixed end closure member is a plug having a frusto-conical portion defining a seating for the first sealing ring, the first sealing ring having a complementary inclined face.

12. A duct according to claim 11, wherein the movable sealing ring is arranged for axial sliding movement within the associated sleeve.

13. A duct according to claim 12, wherein the movable end closure member is a plug having a collar portion retaining it axially in the associated sleeve.

14. A duct according to claim 13, wherein the movable end plug has a cylindrical surface for centring the associated said second sealing ring, and defines a radial shoulder extending the said centring surface.

15. A duct according to claim 14, wherein the said outer body having the said guiding and sealing surface further defines a relief groove adjacent to the said guiding and sealing surface for enabling fluid to flow between the said coupling elements when the latter are assembled together.

16. A duct according to claim 1, further including centring means defined between the said end closure members.

17. A duct according to claim 16, wherein the movable end closure member has a frusto-conical frontal cavity defining a flat base, the fixed end closure member defining a complementary frontal projecting element, the said cavity and projecting element together defining said centring means.

18. A duct according to claim 16, wherein the said first sealing ring of one said coupling element and the said ferrule of the other coupling element together define a clearance between them when the end closure members are in contact with each other.

19. A duct according to claim 1, wherein the female coupling element has the fixed end closure member and the first sealing ring, and the male coupling element has the movable end closure member and the associated said second sealing ring.

* * * * *